US012618659B2

(12) United States Patent
Pokora et al.

(10) Patent No.: US 12,618,659 B2
(45) Date of Patent: May 5, 2026

(54) BATTERY PACK CONFIGURED TO DETERMINE A DEFORMATION EVENT

(71) Applicant: RIVIAN IP HOLDINGS, LLC, Irvine, CA (US)

(72) Inventors: Mark Pokora, San Clemente, CA (US); Kyle O'Neil, Los Angeles, CA (US); Milosh Stojcic, Newport Beach, CA (US); Long Huynh, Brea, CA (US); Vignesh Sekar, Canton, MI (US); Justin Rodenburg, Santa Monica, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 646 days.

(21) Appl. No.: 17/857,966

(22) Filed: Jul. 5, 2022

(65) Prior Publication Data

US 2023/0032112 A1     Feb. 2, 2023

Related U.S. Application Data

(60) Provisional application No. 63/226,566, filed on Jul. 28, 2021.

(51) Int. Cl.
*G01B 7/16*        (2006.01)
*H01M 10/48*        (2006.01)
(52) U.S. Cl.
CPC .............. *G01B 7/16* (2013.01); *H01M 10/48* (2013.01); *H01M 2220/20* (2013.01)
(58) Field of Classification Search
CPC .......... G01B 7/16; G01B 7/18; H01M 10/48;

H01M 2220/20; H01M 2010/4271; H01M 2200/20; H01M 10/425; H01M 10/482; H01M 10/488; H01M 50/249; H01M 50/578; Y02E 60/10
See application file for complete search history.

(56) References Cited

U.S. PATENT DOCUMENTS

| | | | |
|---|---|---|---|
| 2013/0330975 A1 | 12/2013 | Hopkinson et al. | |
| 2020/0152927 A1 | 5/2020 | Sekar et al. | |
| 2021/0188093 A1* | 6/2021 | Gyani | .................... B60L 50/64 |

FOREIGN PATENT DOCUMENTS

| | | | | |
|---|---|---|---|---|
| CN | 104094128 A | * | 10/2014 | ................ B60L 3/12 |
| CN | 108548517 A | * | 9/2018 | |

(Continued)

OTHER PUBLICATIONS

English translation of CN-104094128-A (Year: 2014).*

(Continued)

*Primary Examiner* — Huy Q Phan
*Assistant Examiner* — Haidong Zhang
(74) *Attorney, Agent, or Firm* — Haley Guiliano LLP

(57) ABSTRACT

Systems and methods are provided for determining a deformation event in a battery pack. The battery pack may comprise a conductive path coupled to a first electrical connector and a second electrical connector. Processing circuitry may be configured to detect a change in an electrical characteristic of the conductive path indicating a transition from a first circuit state of the conductive path to a second circuit state of the conductive path. The processing circuitry may be configured to determine, in response to the detecting, a deformation event in the battery pack.

20 Claims, 11 Drawing Sheets

100

(56) References Cited

FOREIGN PATENT DOCUMENTS

| | | | |
|---|---|---|---|
| DE | 102012204788 | | 9/2013 |
| JP | 2000-340264 A | | 12/2000 |
| JP | 2020109723 A | * | 7/2020 |
| KR | 20120138125 A | * | 12/2012 |
| WO | 2021-036371 A1 | | 3/2021 |

OTHER PUBLICATIONS

English translation of CN-108548517-A (Year: 2018).*
English translation of JP-2020109723-A (Year: 2020).*
English translation of KR-20120138125-A (Year: 2012).*

* cited by examiner

222

802

806

808

BATTERY PACK CONFIGURED TO DETERMINE A DEFORMATION EVENT

CROSS-REFERENCE TO RELATED APPLICATION

This application claims the benefit of U.S. Provisional Application No. 63/226,566 filed Jul. 28, 2021, the disclosure of which is hereby incorporated by reference herein in its entirety

INTRODUCTION

Electric vehicles include battery packs. Battery packs can perform a number of functions, including providing a protective enclosure to withstand impacts, routing of electrical wires, and containment in the event of a battery fire.

Electric vehicles can be subjected to a wide range of operating environments. For example, electric adventure vehicles are being encouraged to be driven in off-road environments. Such electric vehicles are exposed to rough terrain, as well as water fording scenarios. In some situations, these environments may expose the battery pack to damage and may puncture the pack structure. Continuing to use an electric vehicle with battery pack damage or a puncture can lead to further damage from, for example, contaminants entering the battery pack structure.

SUMMARY

Accordingly, described herein are systems, methods and apparatuses configured to determine or diagnose a deformation event in a battery pack. The battery pack may comprise a conductive path coupled to a first electrical connector and a second electrical connector. The battery pack may comprise processing circuitry configured to detect a change in an electrical characteristic of the conductive path indicating a transition from a first circuit state of the conductive path to a second circuit state of the conductive path. The processing circuitry may determine, in response to the detecting, a deformation event in the battery pack. In some embodiments, In some embodiments, the processing circuitry is configured to detect the change in the electrical characteristic based on a signal received via the first and second electrical connectors. In some embodiments, the first circuit state is a closed circuit state of the conductive path and the second circuit state is an open circuit state of the conductive path. In some embodiments, the first circuit state is an open circuit state of the conductive path and the second circuit state is a closed circuit state of the conductive path.

In some embodiments, the first and second electrical connectors comprise first and second pogo pins. In some embodiments, the battery pack may comprise at least one layer, and the conductive path comprises a continuous loop of conductive material embedded in the at least one layer. The conductive path may be coupled to the first pogo pin via a first contact pad, and the conductive path may be coupled to the second pogo pin via a second contact pad. The conductive path may be coupled to the processing circuitry via the first pogo pin and the second pogo pin.

In some embodiments, the conductive path comprises a first separate loop of conductive material, and a second separate loop of conductive material. The processing circuitry may be configured to detect a change in the electrical characteristic of the conductive path by detecting the change in the electrical characteristic of the first separate loop of conductive material or by detecting the change in the electrical characteristic of the second separate loop of conductive material.

In some embodiments, the conductive path comprises a first separate loop of conductive material, a second separate loop of conductive material, a third separate loop of conductive material, and a fourth separate loop of conductive material. The processing circuitry may configured to detect the change in the electrical characteristic of the conductive path by detecting changes in the electrical characteristic of the first separate loop of conductive material and the third separate loop of conductive material; or the first separate loop of conductive material and the fourth separate loop of conductive material; or the second separate loop of conductive material and the third separate loop of conductive material; or the second separate loop of conductive material and the separate fourth separate loop of conductive material.

In some embodiments, the processing circuitry is configured to detect the change in the electrical characteristic of the conductive path by determining, based on an output signal of a digital flip-flop, a transition from a first state of the digital flip-flop to a second state of the digital flip-flop.

In some embodiments, the battery pack comprises an upper layer, a lower layer, and a middle layer disposed between the upper layer and the lower layer, the middle layer comprising the conductive path.

In some embodiments, the processing circuitry is configured to detect the change in the electrical characteristic of the conductive path by determining that the electrical characteristic exceeds a threshold amount.

In some embodiments, the processing circuitry is the processing circuitry is further configured to cause a notification to be generated for display, at a display of an electric vehicle, wherein the notification comprises an indication that the battery pack is damaged by a puncture or a bend, and the deformation event comprises the puncture or the bend.

In some embodiments, the processing circuitry is further configured to, in response to determining the deformation event in the battery pack, determine, based on sensor data received from an isolation leakage sensor, whether isolation leakage is present. The processing circuitry may, in response to determining the presence of the isolation leakage, generate for output, at a display of an electric vehicle, a notification indicating the presence of the isolation leakage.

In some embodiments, the processing circuitry is further configured to determine, based on sensor data, that water is present in the battery pack, and cause a notification to be generated for display, at a display of an electric vehicle, based on the determination that water is present and the determination of the deformation event.

In some embodiments, systems and methods are provided for implementing the battery pack. In some embodiments, a non-transitory computer-readable medium is provided having non-transitory computer-readable instructions encoded thereon that, when executed by a processor, cause the processor to detect a change in an electrical characteristic of a conductive path coupled to a first and a second electrical connector, the change indicating a transition from a first circuit state of the conductive path to a second circuit state of the conductive path, or indicating a transition from an open circuit state of the conductive path to a closed circuit state of the conductive path; and determine, in response to the detecting, a deformation event in the battery pack.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
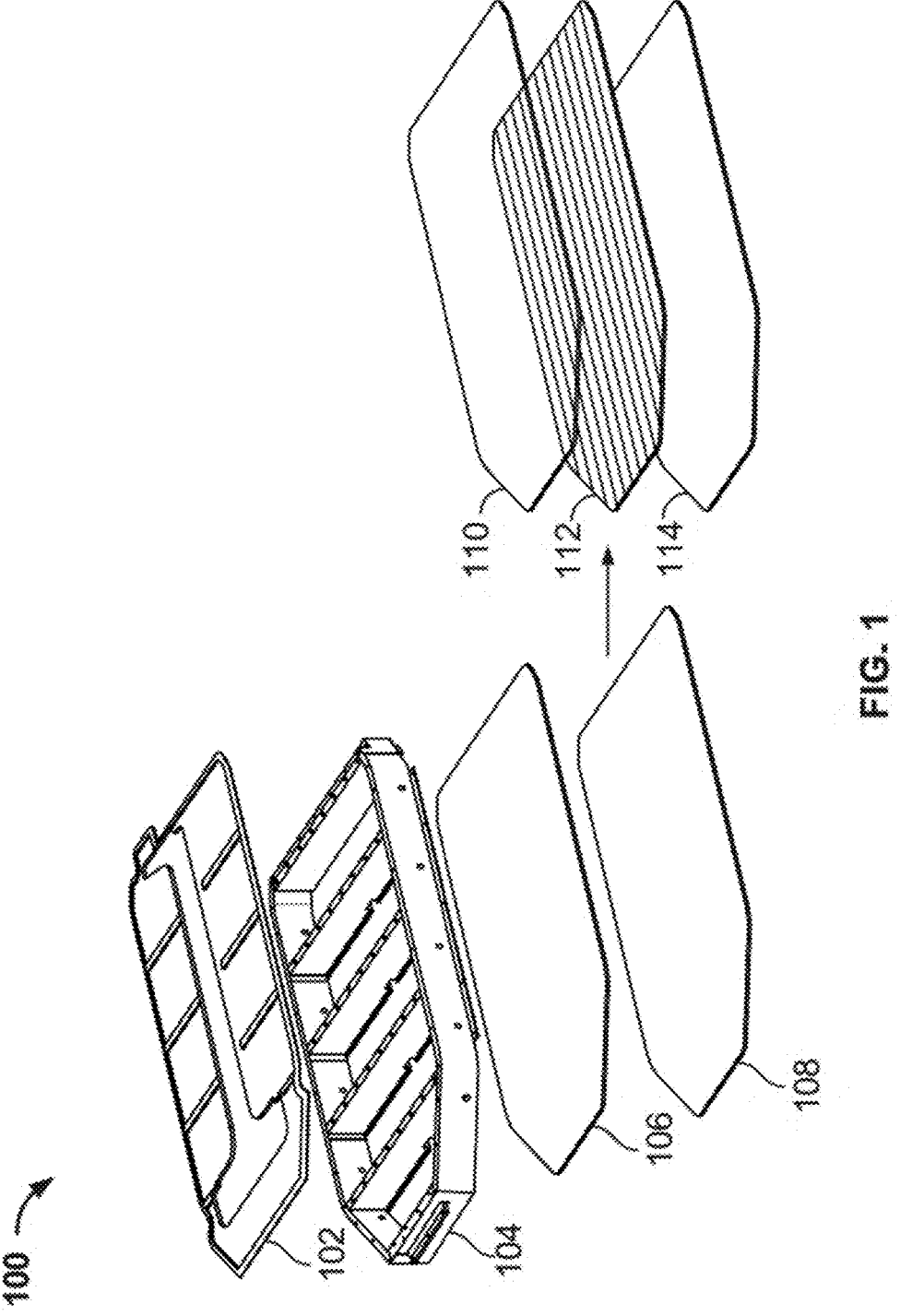
FIG. 1 illustrates isometric exploded views of an exemplary battery pack, in accordance with some embodiments of the disclosure.

The present disclosure is directed to techniques for determining a deformation event in a battery pack. FIG. 1 illustrates isometric exploded views of an exemplary battery pack 100, in accordance with some embodiments of the disclosure. As shown on the left side of FIG. 1, battery pack 100 may comprise one or more of top lid 102, frame 104, bottom plate or bottom layer 106, and strike plate or skid plate 108. Top lid 102 may be positioned above frame 104 and may be affixed thereto, bottom layer 106 may be positioned below frame 104 and may be affixed thereto, and skid plate 108 may be positioned below bottom layer 106 and may be affixed thereto. Any suitable technique may be used to bond the layers of battery pack 100 (e.g., adhesive, spot welding, mechanical fasteners). In some embodiments, battery pack 100 is an electric vehicle battery pack.

As shown on the right side of FIG. 1, skid plate 108 may optionally comprise top layer 110 nearest bottom layer 106 and affixed thereto when battery pack 100 is assembled. Middle layer 112 may be attached to top layer 110 and bottom layer 114 of skid plate 108. Skid plate 108 may be implemented in a similar manner as is discussed in more detail in connection with commonly owned U.S. application Ser. No. 16/682,738 to Sekar et al., filed Nov. 13, 2019 and published as US 2020/0152927 A1, the contents of which is incorporated by reference herein in its entirety.

In some embodiments, one or more of top lid 102, frame 104, bottom layer 106, and skid plate 108 may be a composite layer. Top lid 102 may comprise carbon laminate having layers of carbon fibers and/or glass laminate having layers of glass fibers, with steel elements affixed to portions of a top surface thereof. Frame 104 may comprise extruded aluminum and may further comprise die cast aluminum affixed to side portions thereof. In some embodiments, bottom plate 106 may comprise carbon laminate and/or glass laminate and may comprise any suitable number of stacked layers (e.g., 15). Additionally or alternatively, bottom plate 106 may include one or more layers comprising metals or alloys thereof (e.g., aluminum and/or steel layers). The carbon laminate may comprise any suitable combination of fiber orientation, e.g., bottom layers of bottom plate 106 may have a negative orientation (e.g., −45°), top layers of bottom plate 106 may have a positive orientation (e.g., 90°), or one or more of the layers may have a 0° fiber angle.

Figure 2:
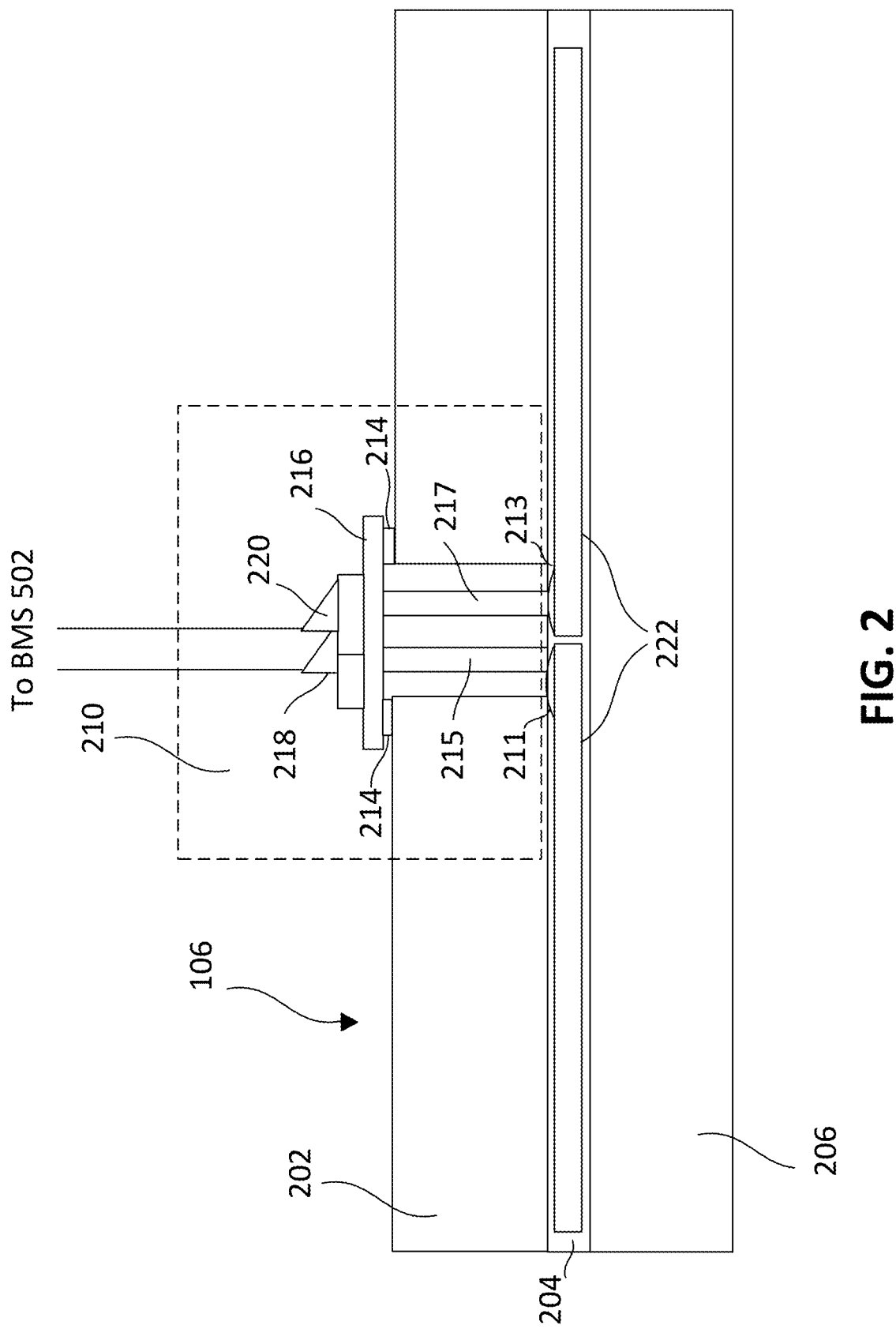
FIG. 2 shows an exemplary arrangement of a layer of a battery pack, in accordance with some embodiments of the disclosure.

FIG. 2 shows an exemplary arrangement of a layer of a battery pack 100, in accordance with some embodiments of the disclosure. Bottom layer 106 of battery pack 100 may comprise layers 202 (e.g., an upper carbon fiber layer), layer 204 and layer 206 (e.g., a lower carbon fiber layer). Layer 204 of bottom layer 106 may comprise conductive path 222 which may correspond to a conductive wire or trace (e.g., copper and/or conductive carbon fiber and/or a metallic film or any other suitable conductive material or any combination thereof) embedded and/or molded and/or wet pressed in any suitable material (e.g., carbon fiber, cloth, plastic, paper, or any other suitable material or any combination thereof). Bottom layer 106 may be manufactured using any suitable technique. In some embodiments, bottom layer 106 may be manufactured by providing a plurality of layers (e.g., of carbon fiber, and/or any other suitable material) where one layer (e.g., layer 204) may contain conductive path 222.

In some embodiments, electrical connector 215 and electrical connector 217 (e.g., pogo pins, one-piece connectors, plugs, sockets, probes, pins, magnetic connectors and/or any other suitable electrical connector) may be coupled to conductive path 222, e.g., directly or by way of contact pads 211, 213 (e.g., comprising for example, graphite foil or copper mesh or copper lamella). Any suitable number of electrical connectors may be employed in the configuration of FIG. 2. In some embodiments, once layer 106 is formed, one side of layer 204 may be machined (e.g., through layer 202) to expose contact pads 211 and 213, and when layer 204 is attached to frame 104, electrical connectors 215, 217 (e.g., spring-loaded pogo pins) may make spring contact with the contact pads 211 and 213. In some embodiments, contact pads 211, 213 may be secured to conductive path 222 by way of a crimping technique. In some embodiments, milling may be performed on an underside of the embedding material in a vicinity of contact pads 211, 213.

In some embodiments, conductive path 222 may comprise a conductive loop starting at contact pad 211 (e.g., a sense mat ribbon), meandering through one or more area regions of bottom layer 106 and ending at contact pad 213, e.g., located proximate contact pad 211. Conductive path 222 may be coupled to printed circuit board (PCB) 216 (e.g., configured to be in communication with, and/or implement at least in part, a battery management system (BMS) 502) by way of electrical connectors 215, 217 having respective spring contacts 218. In some embodiments, electrical connector 215, 217 may be coupled to BMS 502 by way of spring contacts 218 and/or one or more wires shown in FIG. 2. In some embodiments, sealant or epoxy 214 may be employed to affix PCB 216 to upper layer 202 of layer 106. In some embodiments, electrical connectors 215, 217 may be spring-loaded connectors implemented as one of a variety of types of configurations (e.g., through-hole design, surface mount design, barrel crimp, solder cup, or any combination thereof), which may be useful as blind mating connectors.

As shown in FIG. 2, electrical connector 215, electrical connector 217, wiring to BMS 502 and/or any suitable portions of BMS 502, any suitable portion(s) of bottom layer 106, any suitable housing, PCB 216, epoxy 214, and/or any other suitable component, or any combination thereof, may be considered as part of a puncture sensor 210. In some embodiments, puncture sensor 210 may be configured to detect a break in a wire forming conductive path 222. In some embodiments, conductive path 222 and/or contact pads 211, 213 may be considered separate from puncture sensor 210. Alternatively, conductive path 222 and/or contact pads 211, 213 may be considered to form at least a part of puncture sensor 210. In some embodiments, circuitry of PCB 216, and/or BMS 502 (which may be electrically coupled to PCB 216, electrical connector 215 and 217, contact pads 211 and 213 and conductive path 222), may be configured detect a change in one or more electrical characteristics (e.g., resistance, voltage, current) of conductive path 222, and determine the occurrence of a deformation event (e.g., a puncture of battery pack 100 or a deformation or bend of battery pack 100) based on the detected one or more changed electrical characteristics. For example, if a breach of battery pack 100 occurs (e.g., based on the underside of the electric vehicle striking a rock, the ground or other terrain, or an object breaching battery pack 100), conductive path 222 may be broken and caused to transition from a first circuit state (e.g., a closed circuit state) to a second circuit state (e.g., an open circuit state), causing a change in resistance of the conductive path 222, and a deformation event may be detected. In some embodiments, PCB 216 (e.g., configured to implement, or otherwise be in communication with BMS 502) may be located within battery pack 100, or alternately may be located at another location within the electric vehicle of battery pack 100. While in this example conductive path 222 is shown disposed at layer 204 between layers 202 and 206, it should be appreciated that conductive path 222 may be disposed at any portion of battery pack 100 (e.g., at one or more of layers 202 or 206 or any other suitable location, such as for example, in any of the layers shown in FIG. 1).

Figure 3:
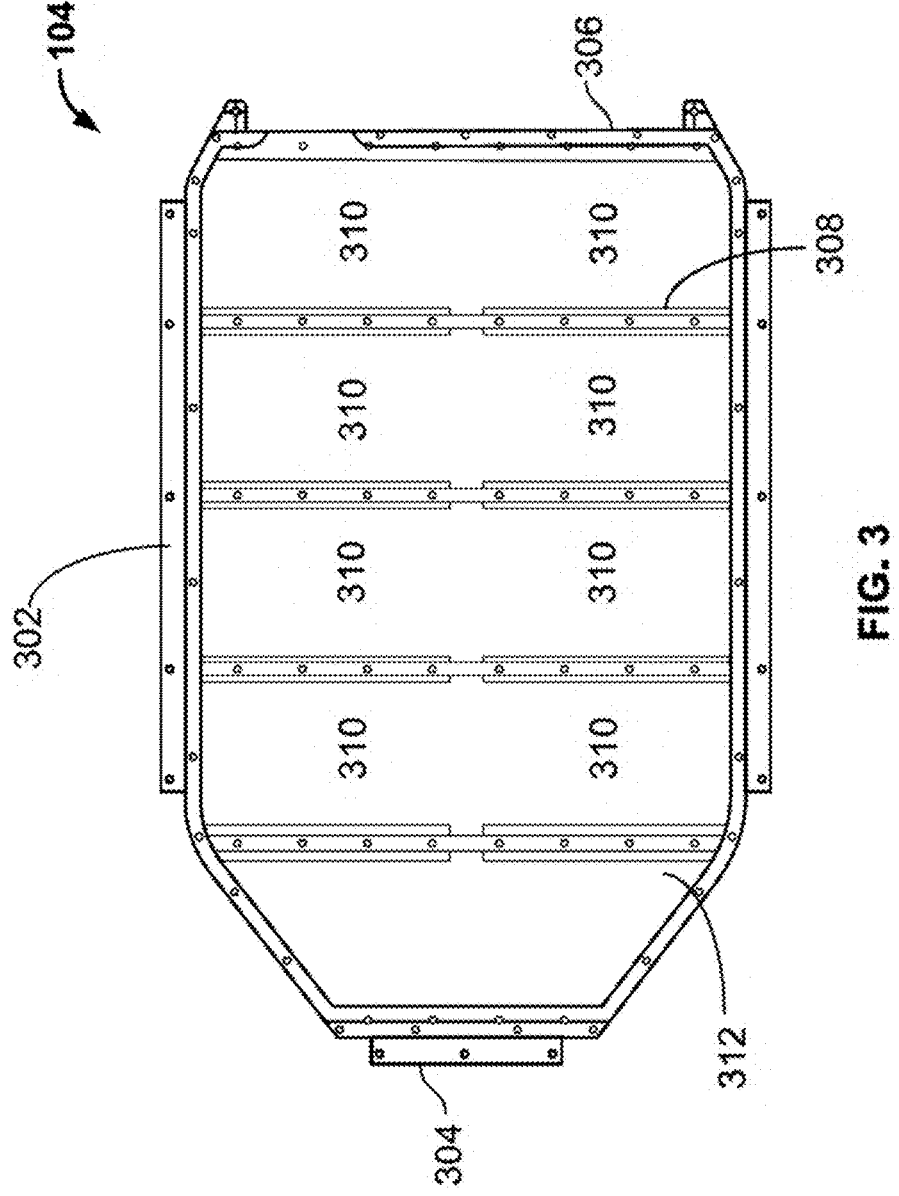
FIG. 3 shows an exemplary arrangement of frame of a battery pack, in accordance with some embodiments of the disclosure.

FIG. 3 shows an exemplary arrangement of frame 104 of a battery pack 100, in accordance with some embodiments of the disclosure. Frame 104 may provide structural rigidity and strength to withstand impact and protect battery modules accommodated (e.g., at portions 310) in a battery pack 100, which may be positioned, for example, in a bottom portion of an electric vehicle under the vehicle cabin. For example, any suitable number of battery modules (e.g., 8) may be positioned and secured within the frame 104 and may be configured to provide electrical power to operate an electric vehicle. For example, eight rectangular battery modules may be included in battery pack 100, and may each include one or more (e.g., two) layers of battery cells. In some embodiments, bottom plate 106 of battery pack 100 may be directly exposed to the exterior environment of the vehicle, e.g., and may function as a structural element of the vehicle. In some embodiments, one or more intervening components (e.g., skid plate 108, shield drivetrain components) may be installed between at least a portion of bottom plate 106 and the exterior environment. It may be desirable for bottom plate 106 and/or skid plate 108 to provide particular structural characteristics, such as long-term resistance to forces incurred during driving as well as blunt forces such as ground strikes.

As shown in FIG. 3, frame 104 may comprise side retaining members 302, front retaining member 304, rear retaining member 306, and cross members 308. Side retaining members 302 may extend along opposite outer sides of frame 104 to form a peripheral shape of frame 104, and a plurality of cross members 308 may transversely extend in parallel to each other between side retaining members 302. Such arrangement of cross members 308 may create a number of channels therebetween to form portions or areas 310 for the installation of battery modules, although any suitable arrangement may be utilized. In some embodiments, opposite ends of each cross member 308 may connected to each side retaining member 302 in any suitable manner (e.g., via brackets and fasteners) that provides sufficient strength for the resulting frame 104 to protect electric batteries therein in the event of vehicle impact and provide suitable attachment points for other components of the vehicle. Frame 104 may be at least partially open and comprise a variety of points for ingress and egress of relevant components. In some embodiments, side retaining members 302, front retaining member 304, rear retaining member 306, and cross members 308 may each be machined or otherwise acted upon in any manner, to accommodate any other structures within the battery pack, e.g., to include a center cutout proximate to surfaces thereof, to accommodate structures such busbars. Connection area 312 may correspond to a portion of battery pack 100 at which puncture sensor 210 contact (e.g., implementing or otherwise coupling puncture sensor 210 to BMS 502), and/or at which electrical connectors 215 and 217 contact PCB 216.

Figure 4:
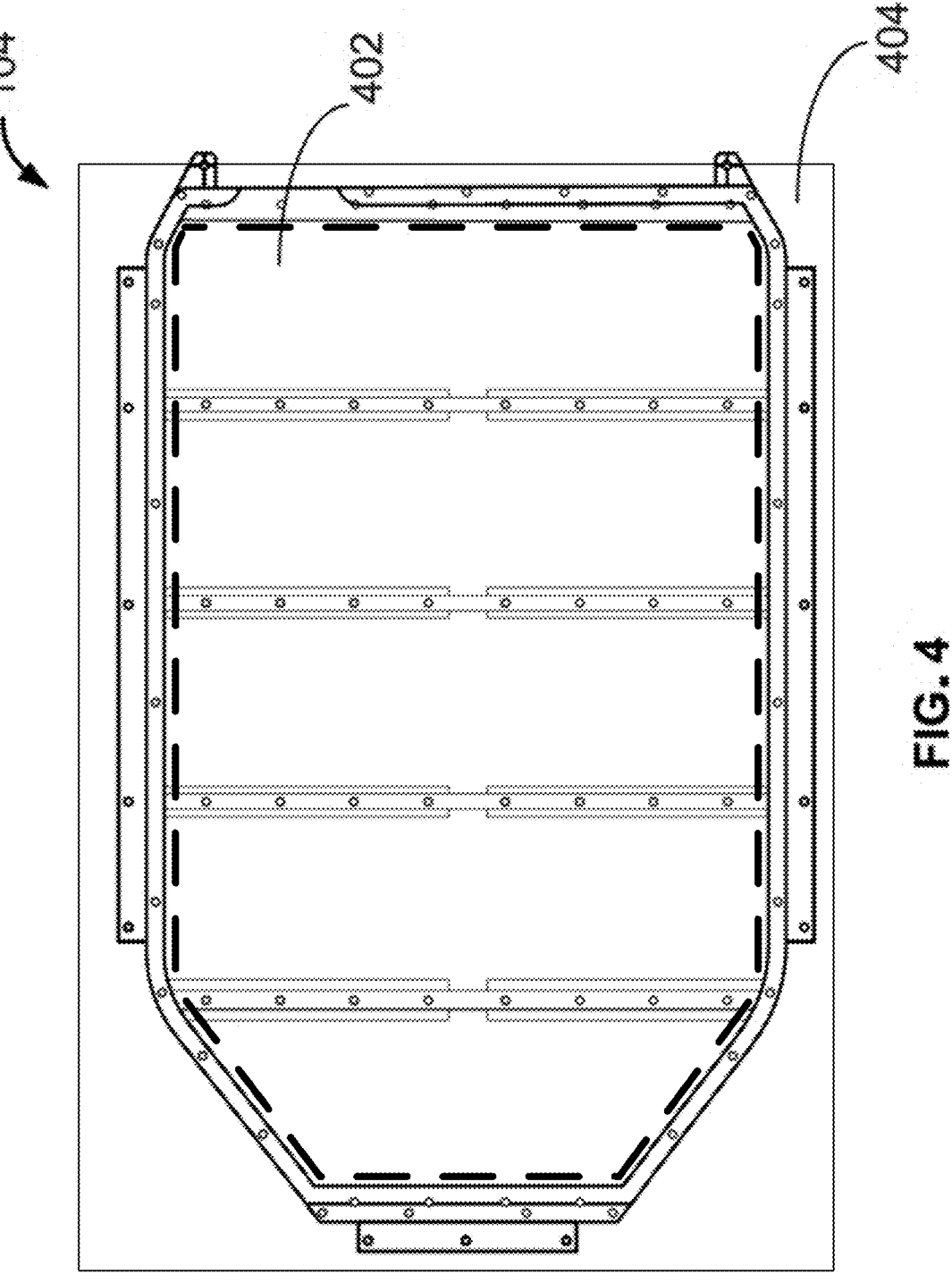
FIG. 4 shows an exemplary sensing area associated with a conductive path of a battery pack, in accordance with some embodiments of the disclosure.

FIG. 4 shows an exemplary sensing area 402 associated with conductive path 222 of a battery pack 100, in accordance with some embodiments of the disclosure. Sensing area 402 is represented by the dashed boundary lines of FIG. 4. Conductive path 222, which may correspond to a conductive wire or trace (e.g., copper and/or conductive carbon fiber and/or a metallic film or any other suitable conductive material) embedded and/or molded and/or wet pressed in any suitable material (e.g., carbon fiber, cloth, plastic, paper and connected to such material by way of, for example, graphite foil or copper mesh or copper lamella), may be provided in the form of a continuous loop in bottom layer 106, positioned below frame 104. In the example of FIG. 4, the loop of conductive path 222 may form sensing area 402 surrounding a perimeter of bottom layer 106 and/or frame 104. For example, the continuous loop of conductive path 222 may traverse back and forth between the boundary of area 402 from one end to the other to provide even coverage of the sensing area. In some embodiments, less than an entire perimeter of bottom layer 106 and/or frame 104 may be encompassed by the loop of conductive path 222 and/or the loop of conductive path 222 may comprise multiple separate loops of conductive trace or one or more portions of any other suitable sensor configuration. Material 404 extending past the perimeter of frame 104 may represent portions of bottom layer 106 having been machined out or otherwise removed from bottom layer 106 during fabrication of battery pack 100.

Figure 5:
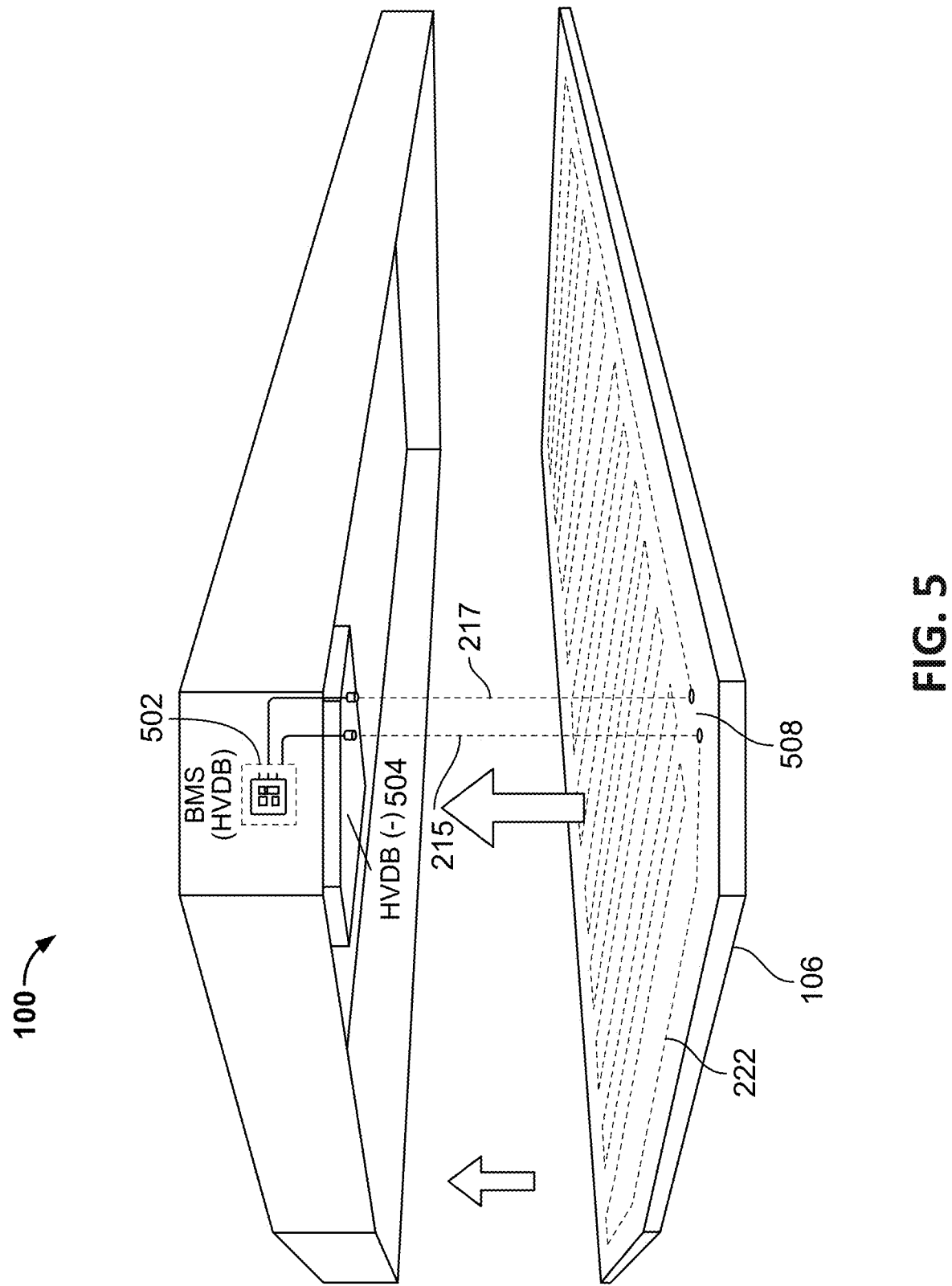
FIG. 5 shows an exemplary arrangement of a layer of a battery pack, in accordance with some embodiments of the disclosure.

FIG. 5 shows an exemplary arrangement of a layer of a battery pack 100, in accordance with some embodiments of the disclosure. As shown in FIG. 5, conductive path 222 may be integrated in, and/or exposed on, bottom layer 106, e.g., in the form of a sensing mat, pad and/or loop (e.g., a conductive loop of oxygen free copper, coated with silver, of any suitable thickness and width). In some embodiments, each of the positive and negative electrodes of conductive path 222 may end in a same general area 508 (e.g., 10 mm apart or any other suitable distance apart). Conductive path 222 may be a continuous conductive loop of any suitable pattern, and may be coupled to electrical connectors 215, 217 directly or via contact pads 211, 213 (not shown in FIG. 5). Electrical connectors 215, 217 may comprise metallic connectors configured to extend to respective contact pads 211, 213, to electrically couple conductive path 222 and BMS 502. In some embodiments, BMS 502 may correspond to, or otherwise comprise or be a part of, a high voltage distribution box (HVDB), which may comprise a negative HVDB terminal 504. In some embodiments, puncture sensor 210 may be disposed or mounted, at least in part, at negative terminal 504 of the HVDB and electrically connected thereto.

In some embodiments, electrical connectors 215, 217 may be spring loaded against bottom plate 106 such that the electrical connectors 215, 217 remain secured to bottom plate 106 even if battery pack 100 is exposed to vibrations or other forces during driving of the electric vehicle. For example, pogo pins can be used as electrical connectors 215, 217 to handle additional loading in shocks and vibrations. Another benefit of using pogo pins as electrical connectors 215, 217 is that they can accommodate a large tolerance stack up between puncture sensor 210 and bottom plate 106 with respect to handling different distances due to part-to-part variation, e.g., as part of a manufacturing or assembling process. In some embodiments, BMS 502 may be configured to detect whether an electrical characteristic of conductive path 222 changes, and determine the occurrence of a deformation event based on such detection, e.g., based on an electrical signal received by way of electrical connectors 215, 217. In some embodiments, puncture sensor 210 may be positioned at least in part at the negative HVDB terminal of BMS 502 shown in FIG. 5. In some embodiments, the manufacturing process of bottom layer 106 may comprise forming multiple layers of bottom layer 106 and machining holes into a top portion thereof to reach respective contact pads 211, 213 (not shown) interfacing with each electrical connector 215, 217. Contact pads 211, 213 may be provided with extra thickness to provide tolerance for the machining process, and at least a portion of the contacts pads may be machined out to provide for a connection between the contact pads and electrical connectors 215, 217.

Figure 6:
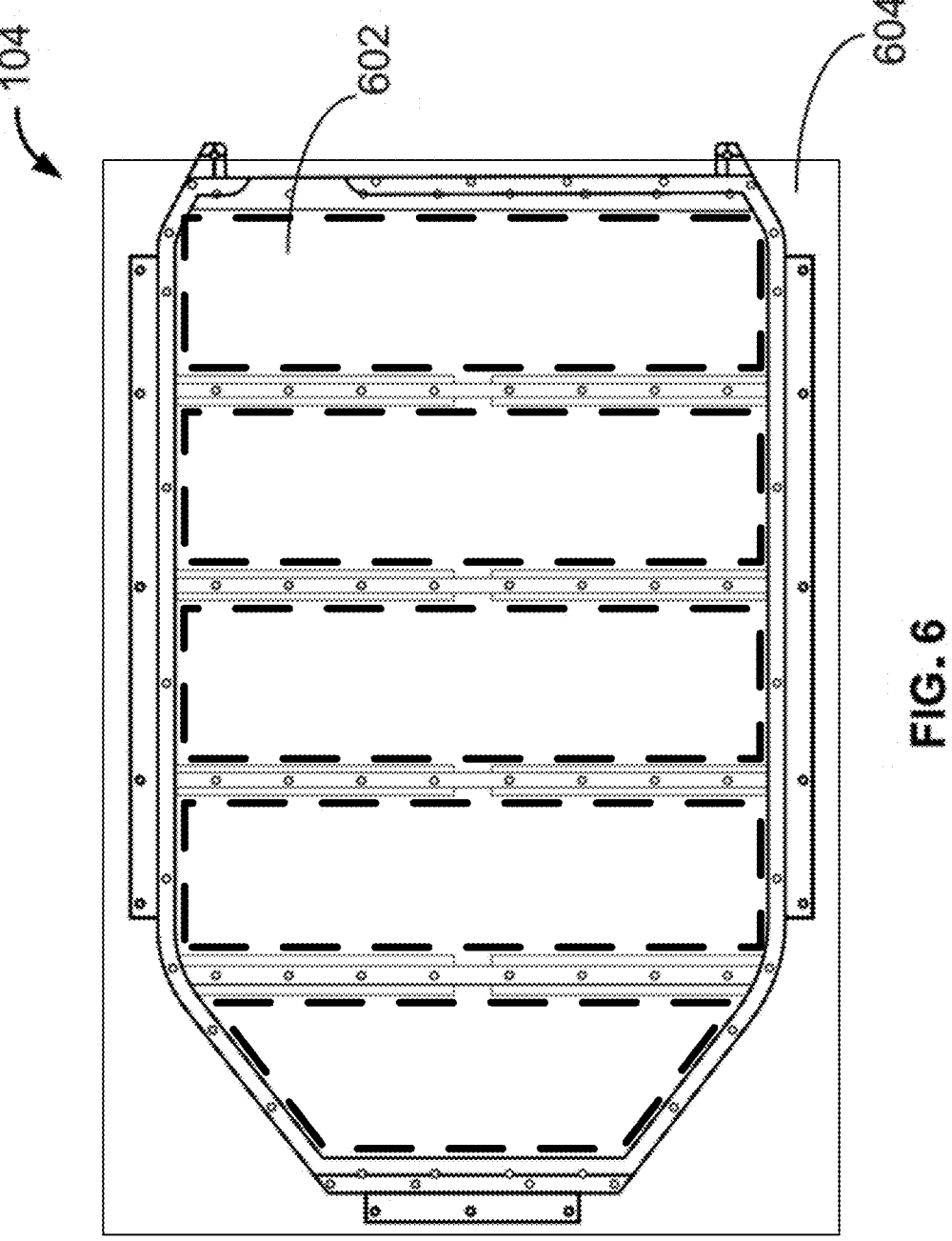
FIG. 6 shows exemplary sensing areas associated with a conductive path of a battery pack, in accordance with some embodiments of the disclosure.

FIG. 6 shows an exemplary sensing areas 602 associated with a conductive path 222 of a battery pack 100, in accordance with some embodiments of the disclosure. Sensing areas 602 are represented by the dashed lines of FIG. 6. Sensing areas 602 comprise a plurality of regions each having respective continuous loops of conductive path 222. Each region may correspond to a position where a battery module may be accommodated in frame 104. In some embodiments, sensing areas 602 may not extend under structural cross members 308. For example, in some circumstances, a deformation event occurrence of a deformation or puncture under structural components such as cross member 308 may be less concerning because such damage may be unlikely to impact the battery modules and operation of battery pack 100. In some embodiments, the region under cross members 308 may include separate conductive paths and/or puncture sensors. In some embodiments, these conductive paths and/or puncture sensors may be associated with a different sensitivity (e.g., a lower sensitivity to detect more severe deformation events).

Figure 7:
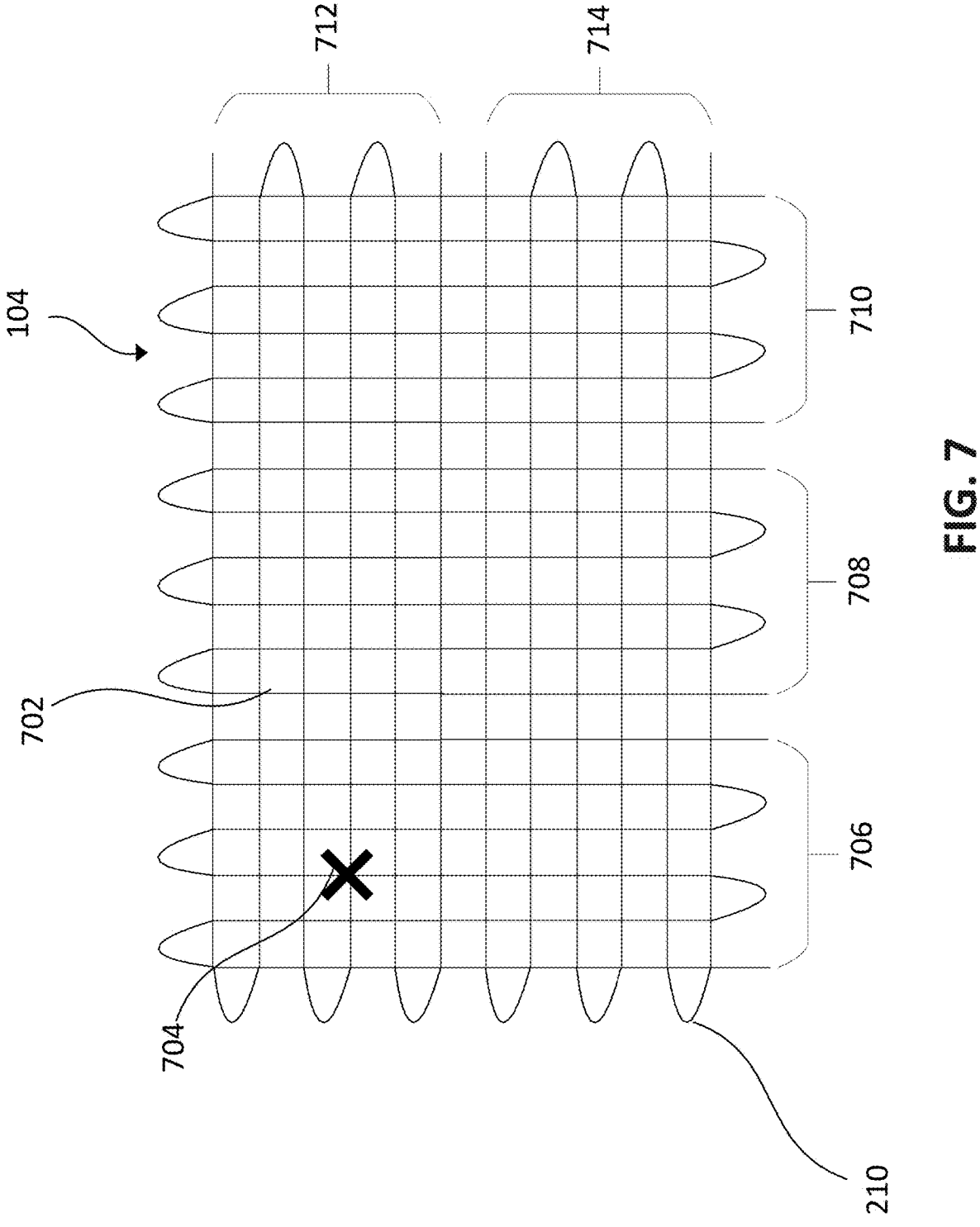
FIG. 7 shows exemplary sensing areas associated with a conductive path of a battery pack, in accordance with some embodiments of the disclosure.

FIG. 7 shows exemplary sensing areas associated with a conductive path 222 of a battery pack, in accordance with some embodiments of the disclosure. As shown in FIG. 7, conductive path 222 may correspond to a plurality of separate conductive paths or conductive loops 706, 708, 710, 712 and 714, respectively spanning in various vertical and horizontal directions of bottom layer 106, which may be positioned below frame 104 (e.g., directly below or separated by one or more other layers of bottom layer 106). Thus, sensing region 702 may be divided into a plurality of regions (e.g., 6 or any other suitable number of regions) to enable pinpointing a location at which a deformation event has occurred. For example, if an object strikes battery pack 100 (e.g., while the electric vehicle is traveling off-road) and punctures or otherwise deforms battery pack 100, BMS 502 may detect this occurrence (e.g., based on a change in resistance of conductive path 222, such as detecting a particular circuit state (e.g., an open circuit condition) associated with conductive path 222 for at least a brief period of time) and determine that the deformation occurrence corresponds to position 704 within a particular region on an underside of battery pack 100. Position 704 of the deformation event may be indicative of a change in resistance in, e.g., conductive path 706 and conductive path 712. The deformation event may be detected based on a change in an electrical characteristic in any suitable combination of the separate conductive loops (e.g., changes detected in separate loops 706 and 712 or changes detected in separate loops 706 and 714; or changes detected in separate loops 708 and 712 or changes detected in separate loops 708 and 714; or changes detected in separate loops 710 and 712 or changes detected in separate loops 710 and 714). For example, at least two changes in electrical characteristics may be detected (e.g., at one of separate conductive loops 706, 708, or 710, and at one of separate conductive loops 712 or 714) to enable pinpointing of the location of the deformation event.

The arrangement of FIG. 7 may also enable BMS 502 and/or service technicians examining battery pack 100 to quickly confirm where the deformation event occurred (e.g., at a particular battery module that may be associated with the deformation event). Any suitable number of conductive paths and/or sensors can be used to increase or decrease the resolution of detecting a location where the damage occurred. In some embodiments, a mesh style conductive wire may be utilized as conductive path 222 in the example of FIG. 7. In some embodiments, any suitable mesh density may be selected for each of conductive loops 706, 708, 710, 712 and 714, and/or conductive loops 706, 708, 710, 712 and 714 may each be arranged to traverse region 702, e.g., go back and forth across region 702, any suitable number of times.

Figure 8:
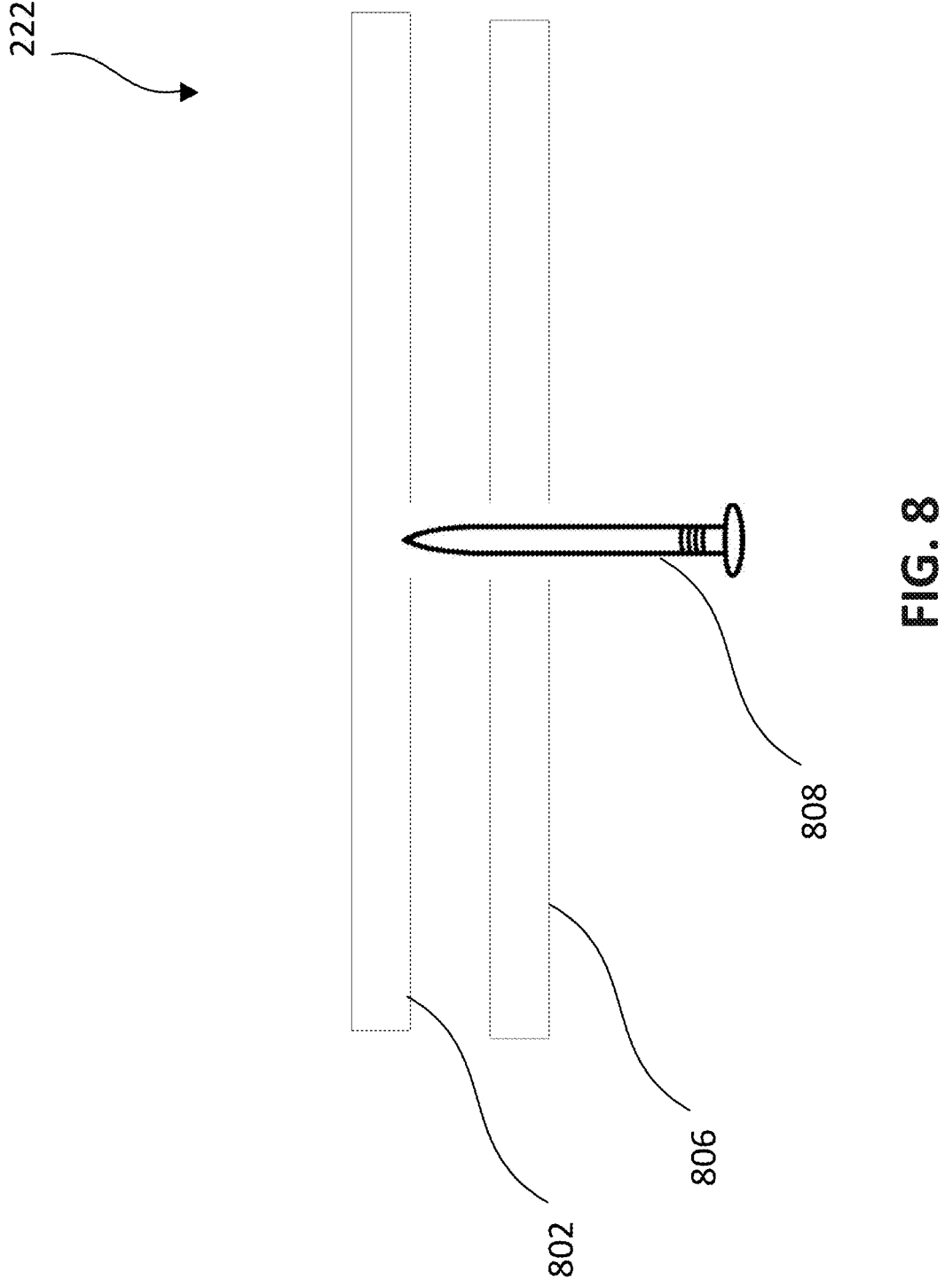
FIG. 8 shows an exemplary configuration of a conductive path, in accordance with some embodiments of the disclosure.

FIG. 8 shows an exemplary configuration of a conductive path, in accordance with some embodiments of the disclosure. Conductive path 222 may comprise conductive layers 802 and 806 (e.g., a plastic laminate having a metal or alloy thereof applied thereon) having space therebetween such that the circuit is normally in a first circuit state (e.g., an open circuit state). Object 808 (e.g., a nail or other conductive object) may strike battery pack 100 (e.g., while the electric vehicle is traveling off-road) and puncture or otherwise deform battery pack 100, and if object 808 contacts one or more of conductive layers 802 and 806, BMS 502 may detect the change or transition of the state of conductive path 222 from a first circuit state (e.g., an open circuit state)

to a second circuit state (e.g., a closed circuit state), and determine a deformation event based on such detected change.

Figure 9:
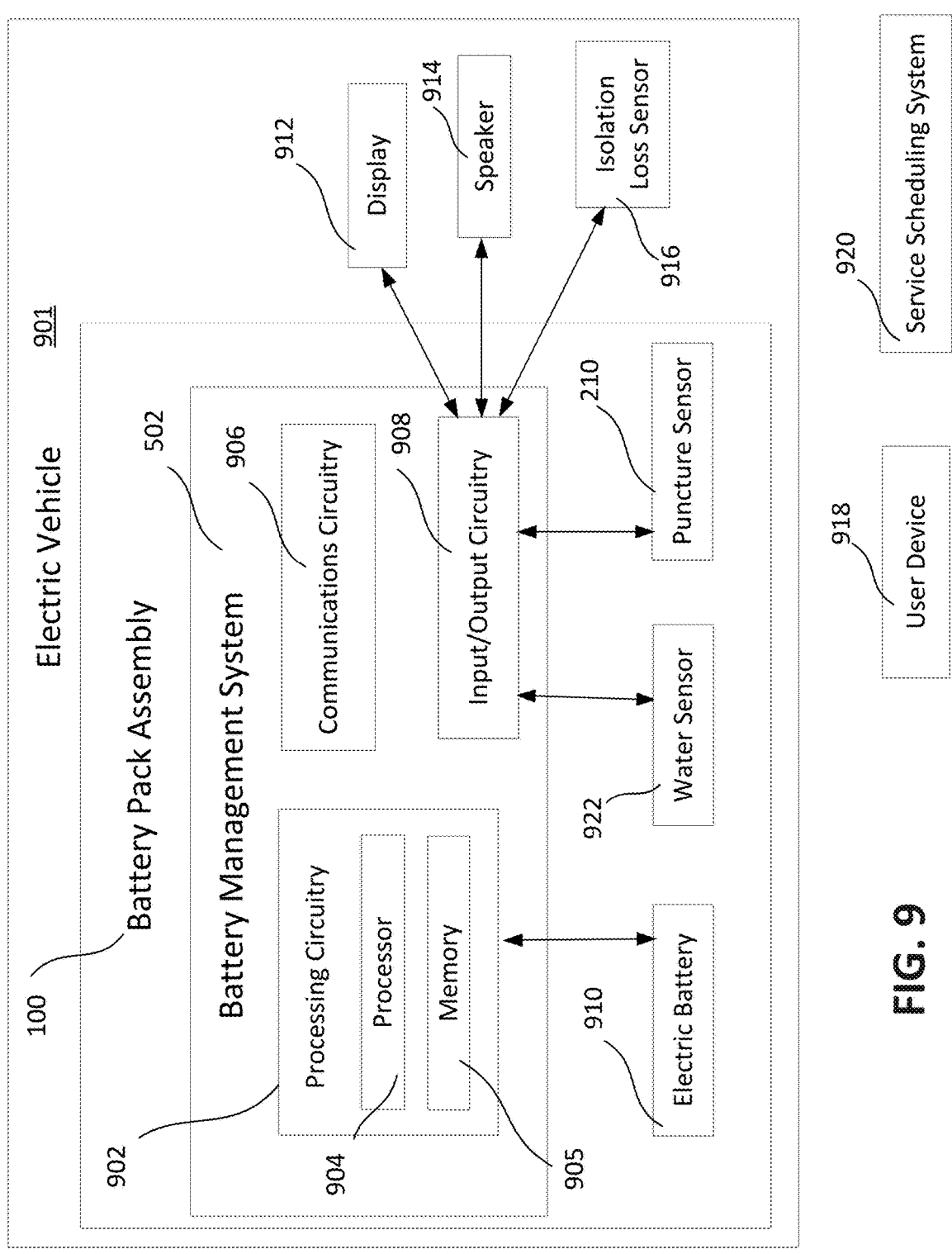
FIG. 9 shows a system comprising electric vehicle, in accordance with some embodiments of this disclosure.

FIG. 9 shows a system 900 comprising electric vehicle 901, in accordance with some embodiments of this disclosure. Vehicle 901 may be a car (e.g., a coupe, a sedan, a truck, an SUV, a bus), a motorcycle, an aircraft (e.g., a drone), a watercraft (e.g., a boat), or any other type of vehicle or any combination thereof. Electric vehicle 901 may comprise processing circuitry 902 which may comprise processor 904 and memory 905. Processor 904 may comprise a hardware processor, a software processor (e.g., a processor emulated using a virtual machine), or any combination thereof. In some embodiments, processor 904 and memory 905 in combination may be referred to as processing circuitry 902 of vehicle 901. In some embodiments, processor 904 alone may be referred to as processing circuitry 902 of vehicle 901. Memory 905 may comprise hardware elements for non-transitory storage of commands or instructions, that, when executed by processor 904, cause processor 904 to operate vehicle 901 in accordance with embodiments described above and below. Processing circuitry 902 may be communicatively connected to components of vehicle 901 and system 900 via one or more wires, or via wireless connection. In some embodiments, memory 905 may be configured to store electronic data, computer software, or firmware, and may include random-access memory, read-only memory, hard drives, optical drives, solid state devices, or any other suitable fixed or removable storage devices, and/or any combination of the same. Non-volatile memory may also be used (e.g., to launch a boot-up routine and other instructions). In some embodiments, processing circuitry 902 may include or be in communication with other processing circuitry in vehicle 901 (e.g., an electronic control unit (ECU) of vehicle 901, which may be configured to communicate with other portions of vehicle 901 and perform various tasks). For example, in some embodiments, BMS 502 and/or processing circuitry 902 of battery pack 100, or functionality thereof, can be included as part of other components of electric vehicle 901, such as an ECU of vehicle 901.

In some embodiments, processing circuitry 902 may include any suitable circuitry for processing signals received from puncture sensor 210 (e.g., via one or more electrical connectors 215, 217). For example, processing circuitry 902 may include signal conditioning circuitry (e.g., filters, amplifiers, voltage dividers), an analog to digital converter, any other suitable circuitry, or any combination thereof. Processing circuitry 902 may, in some embodiments, include a processor, a power supply, power management components (e.g., relays, filters, voltage regulators, differential amplifiers), input/output IO (e.g., GPIO, analog, digital), memory, communications equipment (e.g., CANbus hardware, Modbus hardware, or a WiFi module), any other suitable components, or any combination thereof. In some embodiments, processing circuitry 902 may include one or more microprocessors, microcontrollers, digital signal processors, programmable logic devices, field programmable gate arrays (FPGAs), application-specific integrated circuits (ASICs), etc., and may include a multi-core processor. In some embodiments, processing circuitry 902 may be distributed across multiple separate processors or processing units, for example, multiple of the same type of processing units or multiple different processors.

Processing circuitry 902 may be communicatively connected to electric battery 910, which may be configured to provide power to one or more of the components of vehicle 901 during operation. In some embodiments, vehicle 901 may be an electric vehicle or a hybrid electric vehicle. Electric battery 910 may include one or more battery modules. In some embodiments, battery 910 may be a 180 kWh battery pack or a 135 kWh battery pack. Processing circuitry 902 may manage the flow of electricity to electric battery 910 (e.g., to perform AC-DC conversion when battery 910 is charged with an AC charger), and any other suitable components. Processing circuitry 902 may be configured to manage charging of battery 910, which may include measuring one or more characteristics of battery 910, identifying if a fault has occurred (e.g., in battery 910 or in battery pack 100), providing power to components of vehicle 901, communicating with a battery charger, any other suitable actions, or any combination thereof. Processing circuitry 902 may include or monitor, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Processing circuitry 902 may determine charge status information e.g., charge level, whether the battery is being charged, charging current, charging voltage, charging mode, and whether a charging fault exists. Processing circuitry 902 and/or BMS 502 may be configured to determine the occurrence of a deformation event.

Processing circuitry 902 may further include communications circuitry 906 and input/output (I/O) circuitry 908. I/O circuitry 908 may be communicatively connected to display 912 and speaker 914 by way of I/O circuitry 908. Display 912 may be located at a dashboard of vehicle 901 and/or a heads-up display at a windshield of vehicle 901. For example, a notification regarding the determination of a deformation event may be generated for display, and display 912 may comprise an LCD display, an OLED display, an LED display, or any other type of display. In some embodiments, display 912 may provide an operator and/or passenger of electric vehicle 901 with an indication recommending servicing of vehicle 901 based on the deformation event. Speaker 914 may be located at any location within the cabin of vehicle 901, e.g., at the dashboard of vehicle 901, on an interior portion of the vehicle door. In some embodiments, speaker 914 may be configured to provide audio alerts to notify an operator and/or passenger of electric vehicle 901 of the determined deformation event. In some embodiments, haptic alerts may be provided to notify an operator and/or passenger of electric vehicle 901 of the determined deformation event. In some embodiments, alerts may be provided to user device 918 (e.g., a mobile device, such as, for example, a smartphone or a tablet or a key fob, such as via wireless or wired communication), in addition to or alternative to display 912 and speaker 914 within electric vehicle 901. In some embodiments, the notification may include an indication of a recommendation that electric vehicle 901 avoid water fording activities.

I/O circuitry 908 may be in communication with puncture sensor 210 and/or conductive path 222 (e.g., disposed in bottom layer 106 of battery pack 100), to enable processing circuitry 902 to monitor puncture sensor 210 and/or conductive path 222 and determine the occurrence of a deformation event. I/O circuitry 908 may also be in communication with isolation loss sensor 916. Isolation loss sensor 916 may monitor isolation resistance as between high-voltage components of vehicle 901 and chassis ground. For example, if a deformation event is detected, and subsequently isolation loss is detected by isolation loss sensor 916, processing circuitry 902 may cause a notification to be generated for output (e.g., at vehicle display 912 and/or vehicle speaker 914 and/or at user device 918). For example, isolation loss may be detected based on a detected leakage current exceeding a threshold.

In some embodiments, a water sensor 922 may be included in electric vehicle 901, e.g., to determine whether water is present in or around battery pack 100. For example, water sensor 922 may detect the presence of water based on measuring a decreased resistance between two electrodes, e.g., based on the electrical conductivity of water. In some embodiments, sensor data generated by water sensor 922 may be used in determining whether a deformation event has occurred, and/or may be used in generating notifications to the driver regarding the detected water (e.g., indicating a leak in battery pack 100). For example, processing circuitry 902 may cause a notification to be generated for display, at display 912 and/or a display of user device 918, based on the determination that water is present (as indicated by water sensor 922) and the determination of the deformation event (as indicated by puncture sensor 210). In some embodiments, a load threshold of battery pack 100 may be determined, and data related to an amount of force applied to the battery pack 100 (e.g., due to a ground strike or being struck by a rock while driving) may be communicated to service scheduling system 920 and/or provided as a notification to display 912 or otherwise communicated to the operator of electric vehicle 901. For example, processing circuitry 902 may determine the likelihood of a deformation or puncture at least in part based on the load data.

In some embodiments, in determining the occurrence of a deformation event, processing circuitry 902 may consider the output of puncture sensor 210 (and/or the changed electrical characteristic associated with conductive path 222) in conjunction with one or more other sensor signals, e.g., isolation loss sensor 916 and/or water sensor 922 and/or any other suitable sensors of other suitable sources of information. For example, processing circuitry 902 may determine a confidence score with respect to the occurrence of a deformation event based on such inputs. An alert level of an alert, to be generated for display and/or generated for output to speaker 914 and/or to be transmitted to service scheduling system 920 and/or user device 918, may be determined based upon such confidence score. For example, a lower level alert may be provided if only one of the outputs of puncture sensor 210, isolation loss sensor 916 and water sensor 922 suggest a deformation event has occurred, which may result in a relatively low confidence score. On the other hand, a higher level alert may be provided if two of such sensor outputs suggests that a deformation event has occurred, which may result in a relatively higher confidence score. In some embodiments, an urgent notification may be provided for a very high confidence score (e.g., if all three of such sensor outputs suggest the occurrence of a deformation event), and/or BMS 502 may take corrective action, e.g., reducing current levels within battery pack 100.

In some embodiments, processing circuitry 902 may be in communication (e.g., via communications circuitry 906) with user device 918 (e.g., a mobile device, a computer, a key fob, etc.). Such connection may be wired or wireless. In some embodiments, communications circuitry 906 and/or user device 918 may be in communication with a service scheduling system 920 (e.g., over a communications network such as, for example, the Internet, and/or a cellular telephone network and/or a satellite network and/or any other suitable network or communication technique), to communicate with a service technician entity (e.g., servers associated with the entity or an operator associated with the entity) regarding the determined deformation event. In some embodiments, data related to the deformation event may be automatically transmitted to such service technician entity.

It should be appreciated that FIG. 9 only shows some of the components of vehicle 901, and it will be understood that vehicle 901 also includes other elements commonly found in vehicles (e.g., electric vehicles), e.g., a motor, brakes, wheels, wheel controls, turn signals, windows, doors, etc.

Figure 10:
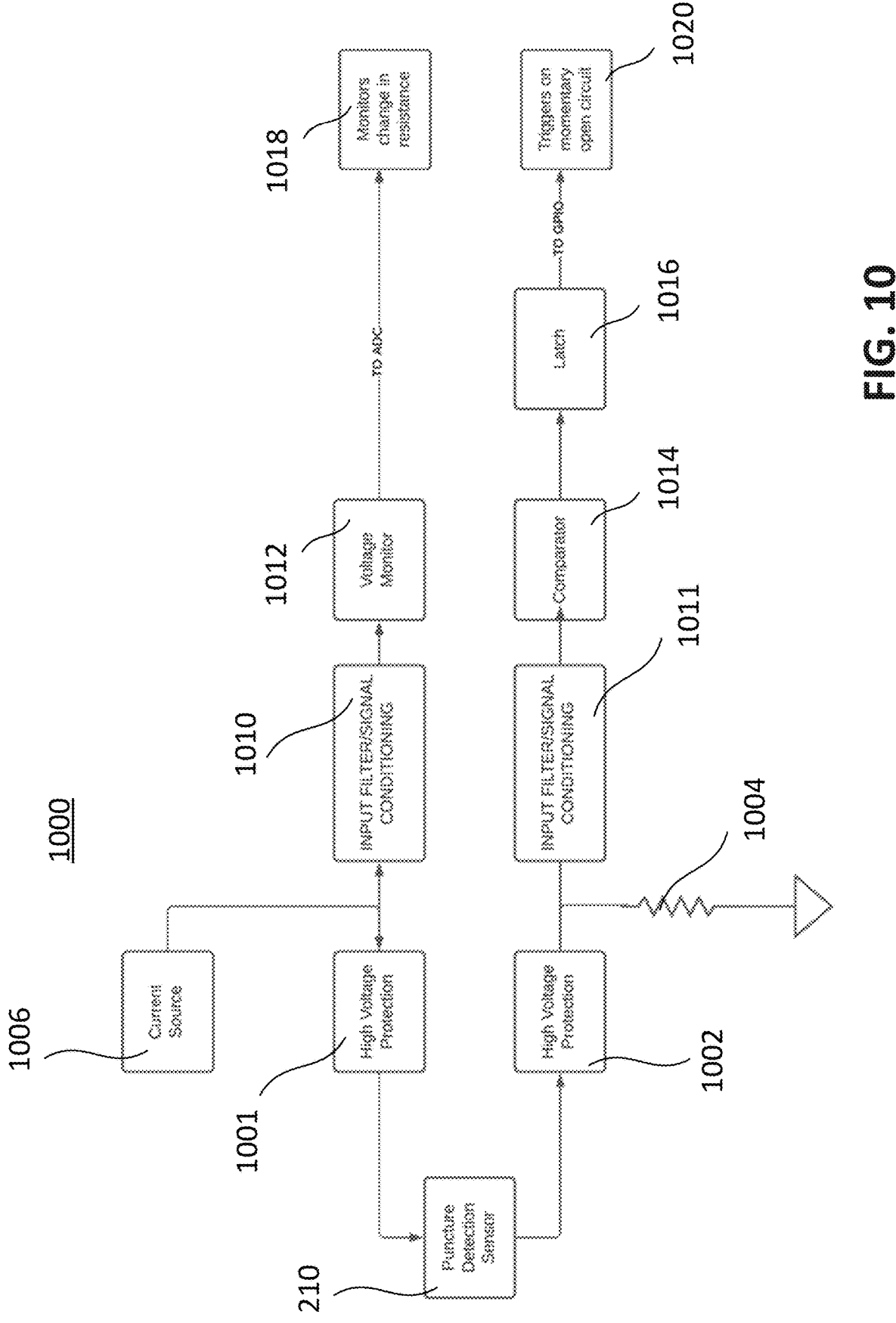
FIG. 10 shows a block diagram of circuitry of a battery pack, in accordance with some embodiments of this disclosure.

FIG. 10 shows a block diagram 1000 of circuitry of battery pack 100, in accordance with some embodiments of this disclosure. In some embodiments, the circuitry discussed in connection with FIG. 10 may be included as part of, or may be otherwise in communication with, processing circuitry 902 of FIG. 9 and/or BMS 502.

As shown in FIG. 10, puncture sensor 210 (and/or conductive path 222) may be connected to high voltage protection circuitry 1001, 1002, e.g., one or more IC chips comprising MOSFETs in combination with one or more resistors 1004, e.g., to diagnose a short to ground condition associated with puncture sensor 210 (and/or conductive path 222). High voltage protection circuitry 1001, 1002 may be configured to protect against power surges and electrostatic damage caused by faults by limiting voltage and/or current across the circuit. Constant voltage or current source 1006 may be configured to output a constant voltage or constant current to puncture sensor 210 (and/or conductive path 222). In some embodiments, constant voltage or current source 1006 may employ a low dropout regulator circuit to regulate a voltage applied to puncture sensor 210 (and/or conductive path 222). The current received by puncture sensor 210 (and/or conductive path 222) from constant source 1006 may be configured to flow from a first terminal of electrical connector 215, 217, through a conductive loop (e.g., as shown in FIG. 5) to a second terminal of electrical connector 215, 217.

In some embodiments, one or more of input filter and/or signal conditioning circuitry 1010, 1011 may be employed. For example, puncture sensor 210 (and/or conductive path 222), current or voltage source 1006 and/or high voltage protection circuitry 1001, 1002 may be coupled to one or more of input filter and/or signal conditioning circuitry 1010, 1011, which may comprise any suitable components configured to perform processing of signals received from prior stages of the circuitry and/or select signals of a particular frequency range, to facilitate further processing of the signals at later stages of the circuitry. In some embodiments, input filter and/or signal conditioning circuitry 1010, 1011 may include, e.g., one or more of resistors, capacitors, inductors, operational amplifiers, transistors, ADC, DAC, differential amplifiers, Zener diodes, Schottky diodes, etc.

In some embodiments, voltage monitor 1012 may be employed, e.g., coupled to input filter and/or signal conditioning circuitry 1010 and/or high voltage protection circuitry 1001 and/or puncture sensor 210 (and/or conductive path 222). Voltage monitor 1012 may employ any suitable number and types of components (e.g., one or more of a comparator, operational amplifier, differential amplifier, instrumental amplifier, voltage supervisor, flip-flop circuitry, latch circuitry, etc.). Voltage monitor 1012 may be configured to detect (at 1018) a resistance change in puncture sensor 210 (and/or conductive path 222), e.g., based on a transition from a first circuit state (e.g., an open circuit state or a closed circuit state) to a second circuit state (e.g., the open circuit state or closed circuit state, based on which the first circuit state), even if a rapid momentary change. In some embodiments, one or more signals output by voltage monitor 1012 may be undergo processing (e.g., analog to digital conversion) for input to processing circuitry 902 at 1018. In some embodiments, voltage monitor 1012 may be configured to provide the functionality of an over voltage monitor, e.g., configured to limit or cut off voltage to prevent damage to electronic circuitry, and/or an under voltage monitor, e.g., configured to interrupt the circuit when a fault condition arises such as voltage below a preset level.

In some embodiments, voltage monitor 1012 may comprise an operational amplifier having two inputs (e.g., a negative feedback input and an input signal associated with puncture sensor 210 and/or conductive path 222), where the output of the operational amplifier corresponds to the voltage or current difference between the inputs of the operational amplifier. The operational amplifier may be configured to amplify a voltage measurement to be output to BMS 502 to facilitate processing of the signal at BMS 502. In some embodiments, such voltage measurement may be used in determining whether a resistance change has occurred, e.g., whether a deformation event has occurred with respect to battery pack 100.

Circuitry 1000 may further comprise comparator 1014, e.g., an operational amplifier configured to compare input signals and output a signal indicating which input signal is larger based on the comparison. Comparator 1014 may monitor one or more electrical characteristics (e.g., voltage, current, resistance) associated with puncture sensor 210 (and/or conductive path 222) and compare such one or more monitored characteristics (e.g., an analog signals) to a threshold input value. For example, if comparator 1014 determines that the threshold input value exceeds a current of the puncture sensor 210 and/or conductive path 222 (e.g., even if for a transitory period), comparator 1014 may output to flip-flop circuit 1016 a signal (e.g., a digital signal) indicating this comparison result. For example, in an open circuit condition of puncture sensor 210 (and/or conductive path 222), no current flows through puncture sensor 210 (and/or conductive path 222) for a period of time. Accordingly, comparator 1014 may determine that a threshold value provided as input to comparator 1014 exceeds a signal that is input to comparator 1014 based on a reading of, e.g., zero amps of current flowing through puncture sensor 210 (and/or conductive path 222) in the open circuit state.

Flip-flop circuit or latch 1016 may be a digital flip-flop or digital latch configured to be switched from a first stable output state to a second stable output state based on a trigger pulse received from comparator 1014. The state of flip-flop circuit 1016 may be a function of prior received inputs and outputs, and flip-flop 1016 may be configured to store binary data and may provide one or two outputs. The output of flip-flop circuit 1016 may depend on the current input as well as the state of flip-flop circuit 1016, and may be edge-triggered by a rising or falling edge of the pulse (e.g., synchronous or clocked) or level-triggered (e.g., asynchronous). Flip-flop circuit 1016 may be, e.g., a D flip-flop, an S-R flip-flop, a J-K flip-flop, a T flip-flop, or any combination thereof. In some embodiments, flip-flop circuit 1016, upon receiving a signal from comparator 1014 indicative of an open circuit condition of puncture sensor 210 (and/or conductive path 222), may output to BMS 502 a signal indicative to BMS 502 of a change of output state from one or more prior outputs of flip-flop circuit 1016. BMS 502 may determine (at 1020) on the basis of the signal received from flip-flop circuit 1016 that a trip or fault condition has occurred in puncture sensor 210 (and/or conductive path 222). It should be appreciated that the open circuit detection mechanism and voltage reading mechanism may be implemented in connection with either terminal of puncture sensor

210 (and/or conductive path 222). In some embodiments, even a momentary fault condition may be detected by BMS 502 (e.g., on the order of milliseconds or microseconds). In some embodiments, flip-flop circuit 1016 may be configured to detect a small change in a value of an electrical characteristic, even if such change persists for only a short period of time, which may be an indication of a deformation event, e.g., flip-flop circuit 1016 may be configured to hold such value.

In some embodiments, a variable resistor may be employed to detect changing resistance values in connection with puncture sensor 210 (and/or conductive path 222), in determining whether a deformation event has or is occurring. In some embodiments, such as in the example described in connection with FIG. 8, a deformation event may be determined based on detecting a closed circuit condition, e.g., based on signals output by comparator 1014 and flip-flop circuit 1016 indicative of a closed circuit configuration. In some embodiments, a deformation event corresponding to a puncture of battery pack 100 may correspond to a reading by BMS 502 of, e.g., 5 V, corresponding to a supply voltage of a battery included in circuitry 1000. On the other hand, the deformation event may correspond to a bend or deformation of battery pack 100 but may not rise to level of a puncture. BMS 502 may determine the occurrence of such an event based on a relatively minor voltage change measured, e.g., at 1018, in a closed circuit condition, as opposed to the open circuit condition of detecting, e.g., 5 V. In some embodiments, flip-flop 1016 may not be triggered in the event of a deformation event that does not rise to the level of a puncture.

Figure 11:
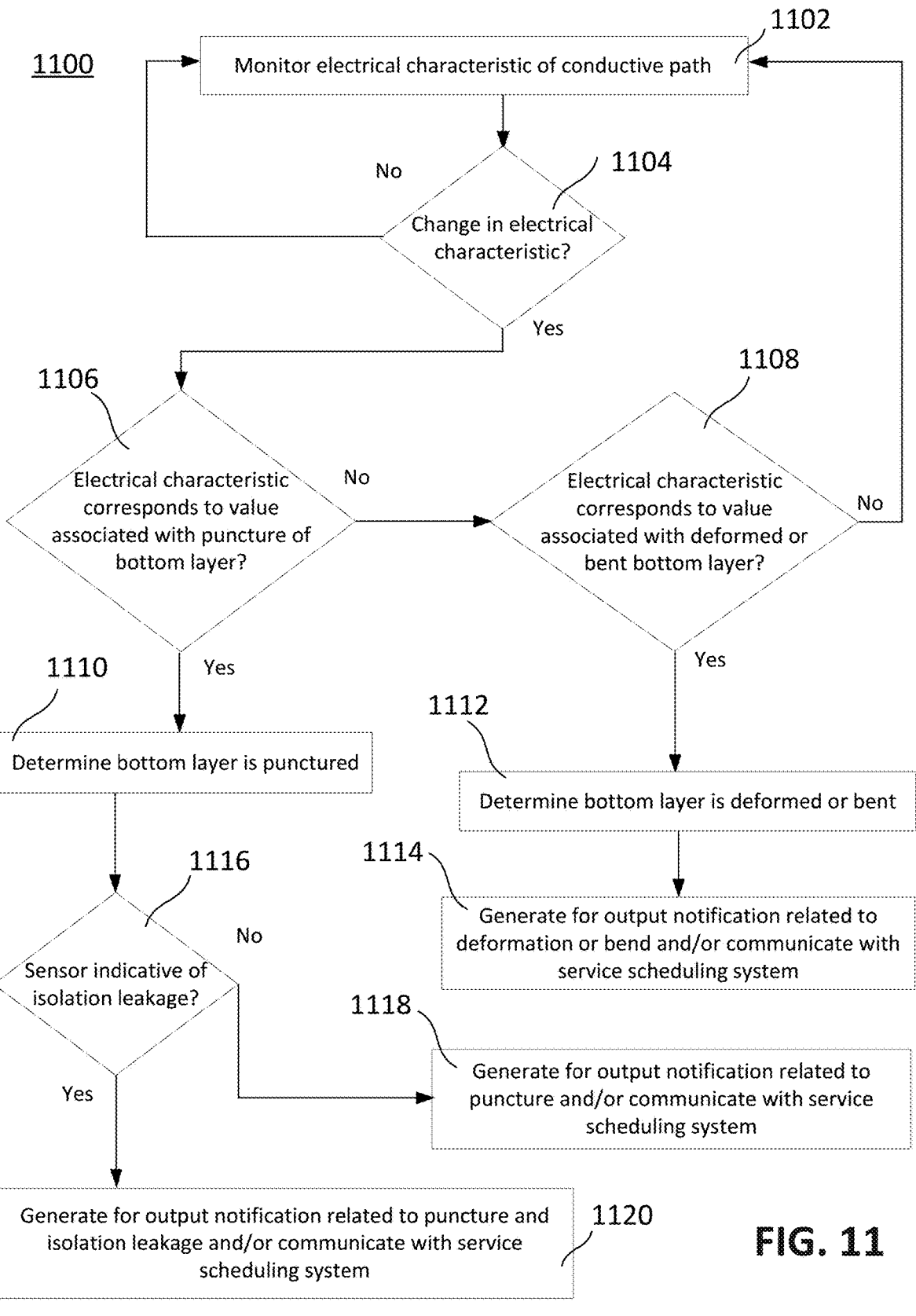
FIG. 11 shows a flowchart of illustrative process for determining the occurrence of a deformation event based on monitoring electrical characteristics of a conductive path, in accordance with some embodiments of the present disclosure.

FIG. 11 shows a flowchart of illustrative process 1100 for determining the occurrence of a deformation event based on monitoring electrical characteristics of a puncture sensor, in accordance with some embodiments of the present disclosure. Process 1100 may be executed at least in part by processing circuitry 902.

At 1102, processing circuitry 902 may monitor one or more electrical characteristics (e.g., resistance, voltage, current) of puncture sensor 210 (and/or conductive path 222) of battery pack 100. For example, processing circuitry 902 may be configured to execute instructions stored in memory 905 to implement battery management system 502. Battery management system 502 may comprise, or otherwise be configured to be in communication with, circuitry 1000 shown in FIG. 10 which may be coupled to puncture sensor 210 (and/or conductive path 222).

At 1104, processing circuitry 902 may detect whether a change in an electrical characteristic of puncture sensor 210 (and/or conductive path 222) has occurred. For example, BMS 502 may receive input at 1018 of FIG. 10 and/or may receive input at 1020 of FIG. 10. The input may be based on a signal received by way of electrical connectors 215, 217, and may be detected based on a transition of conductive path 222 and/or puncture sensor 210 from a first circuit state to a second circuit state. For example, such one or more inputs may indicate the presence of resistance change associated with puncture sensor 210 (and/or conductive path 222), an open circuit condition of puncture sensor 210 and/or conductive path 222 (e.g., corresponding to a voltage reading of 5 V), and/or an output of flip-flop circuit 1016 may be indicative of at a momentary transition of puncture sensor 210 (and/or conductive path 222) from a closed circuit state to an open circuit state (or vice versa, from an open circuit state to a closed circuit state).

At 1106, processing circuitry 902 may determine whether the changed characteristic (e.g., a resistance value of puncture sensor 210, and/or conductive path 222, determined based on a changed voltage reading) is associated with a puncture to bottom layer 106 of battery pack 100. For example, processing circuitry 902 may compare the electrical characteristic to a first predetermined threshold, to determine whether the measured value corresponds to (e.g., is within a predefined range of) a particular state of puncture sensor 210 and/or conductive path 222 (e.g., an open circuit condition of 5 V). If processing circuitry 902 determines the electrical characteristic does correspond to the value indicative of a puncture of battery pack 100, processing may proceed to 1110. If processing circuitry 902 determines the electrical characteristic does not correspond to the value indicative of a puncture of battery pack 100, processing may proceed to 1108.

At 1108, processing circuitry 902 may determine whether the changed characteristic (e.g., a resistance value of puncture sensor 210 and/or conductive path 222 determined based on a changed voltage reading) is associated with a bend or deformation to bottom layer 106 of battery pack 100, even if the electrical characteristic value is not indicative of a puncture to battery pack 100. For example, processing circuitry 902 may detect that a voltage associated with puncture sensor 210 and/or conductive path 222 corresponds to a value (e.g., 4.0 V) that does not indicate an open circuit condition of puncture sensor 210 and/or conductive path 222, but nonetheless indicates some significant change in puncture sensor 210 and/or conductive path 222, based on such value corresponding to a second predetermined value indicative of a deformation or bend. In response to this detection, processing may proceed to 1112. Otherwise, processing may continue to 1102 to continue monitoring the one or more electric characteristics of puncture sensor 210 and/or conductive path 222.

At 1110, processing circuitry 902 may determine, based on a determination at 1106 that a value of the electric characteristic of puncture sensor 210 and/or conductive path 222 is indicative of a puncture, that battery pack 100 (e.g., bottom layer 106 thereof, or another portion of battery pack 100) is punctured. On the other hand, at 1112, processing circuitry 902 may determine, based on a determination at 1108 that a value of the electric characteristic of puncture sensor 210 and/or conductive path 222 is indicative of a bend or other deformation (e.g., other than a puncture), that battery pack 100 (e.g., bottom layer 106 thereof, or another portion of battery pack 100) is bent or deformed. In some embodiments, processing circuitry 902 determining a deformation event may correspond to the determination at 1110 and/or 1112.

At 1114, processing circuitry 902 may generate for output a notification indicative of the determination at 1112 that bottom layer 106 of battery pack 100 (or another portion thereof) is deformed or bent. For example, the notification may be generated for display at display 912 of electric vehicle 901 and/or a display of user device 918. In some embodiments, the notification may additionally or alternatively comprise an audio alert by way of speaker 914 and/or a tactile alert. In some embodiments, communications circuitry 906 may communicate with a service scheduling system 920 (e.g., a server or human technician or operator associated with a manufacturer of electric vehicle 901) to schedule repair or maintenance of vehicle 901 regarding the determined bend or deformation of battery pack 100.

At 1116, processing circuitry 902 may determine, based on sensor data provided by isolation loss sensor 916, whether the sensor data is indicative of the occurrence of isolation leakage. Isolation loss sensor 916 may monitor isolation resistance as between high-voltage components of vehicle 901 and chassis ground. For example, if a deformation event is detected, and subsequently isolation loss is detected by isolation loss sensor 916, processing circuitry 902 may cause a notification to be generated for output (e.g., at vehicle display 912 and/or vehicle speaker 914 and/or at user device 918). For example, isolation loss may be detected based on a detected leakage current exceeding a threshold. In some embodiments, processing circuitry 902 may determine whether the isolation loss is detected within a threshold period of time after the detection of a deformation event being detected. If so, processing circuitry 902 may infer that the object causing the deformation event may have made contact with a bus bar of battery pack 100.

At 1118, processing circuitry 902 may determine, based on the sensor data provided by isolation loss sensor 916, that isolation loss is not present and may generate for output a notification indicative of the determination at 1110 that bottom layer 106 of battery pack 100 (or another portion thereof) is punctured. For example, the notification may be generated for display at display 912 of electric vehicle 901 and/or a display of user device 918. In some embodiments, the notification may additionally or alternatively comprise an audio alert by way of speaker 914 and/or a tactile alert. In some embodiments, communications circuitry 906 may communicate with a service scheduling system 920 (e.g., a server or human operator associated with a manufacturer of electric vehicle 901) to schedule repair or maintenance of vehicle 901 regarding the determined puncture of battery pack 100.

At 1120, processing circuitry 902 may determine, based on the sensor data provided by isolation loss sensor 916, that isolation loss is present and may generate for output one or more notifications indicative of the determination at 1110 that bottom layer 106 of battery pack 100 (or another portion thereof) is punctured, and indicative of the determination related to the occurrence of the isolation loss. For example, the one or more notifications may be generated for display at display 912 of electric vehicle 901 and/or a display of user device 918. In some embodiments, the notification may additionally or alternatively comprise an audio alert by way of speaker 914 and/or a tactile alert. In some embodiments, communications circuitry 906 may communicate with a service scheduling system 920 (e.g., a server or human operator associated with a manufacturer of electric vehicle 901) to schedule repair or maintenance of vehicle 901 regarding the determined puncture of battery pack 100 and the determined isolation loss.

In some embodiments, processing circuitry 902 may perform the determination at 1116, and/or any other suitable determinations with respect to received sensor signals (e.g., a determination associated with an output of water sensor 922), in parallel or in conjunction with the determinations at 1106, 1108, 1110 and 1112. In some embodiments, processing circuitry 902 may determine or generate a confidence score based on one or more of such sensor outputs, such that the confidence score impacts a type of alert or notification that is to be output, and/or the content of such alert or notification. For example, if processing circuitry 902 determines that water is present in battery pack 100, and detects a changed electrical characteristic of conductive path 222, a notification to be output may indicate or otherwise be based on each of these determinations. If processing circuitry 902 determines that isolation leakage is present in battery pack 100, and detects a changed electrical characteristic of conductive path 222, a notification to be output may indicate or otherwise be based on each of these determinations. In some embodiments, a confidence score may depend on an amount by which the electrical characteristic of conductive path 222 changed or an amount by which the electrical characteristic exceeds a threshold, and/or based on an amount of time for which the electrical characteristic exceeds the threshold, and/or the magnitude of an isolation leakage measurement and/or a water sensor measurement and an amount of time that such measurements persisted.

It should be appreciated that process 1100 is merely illustrative and various modifications can be made within the scope of the disclosure. For example, one or more steps (e.g., steps 1108, 1112, 1114, 1116 and 1120) can be optional. In some embodiments, when a puncture is determined at 1110, process 1100 may proceed to 1118 to generate for output a notification of the puncture. Additionally or alternatively, a leakage determination may be made at 1116 after a determination at 1112 is made by processing circuitry 902. In some embodiments, if multiple puncture sensors 210 and/or conductive paths 222 are utilized (e.g., as in the example of FIGS. 6-7) such that processing circuitry 902 may determine a precise location of a deformation event, process 1100 may include a step of monitoring each of the respective puncture sensors 210 and/or conductive paths 222 and providing notifications (e.g., to the operator of vehicle 901 and/or user device 918 and/or to service scheduling system 920) to indicate the determined location of the deformation event.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery pack, comprising:
at least one layer;
a conductive path coupled to a first electrical connector and a second electrical connector, wherein:
the conductive path comprises a continuous loop of conductive material embedded in the at least one layer,
the first electrical connector comprises a first pogo pin and the second electrical connector comprises a second pogo pin;
the conductive path is coupled to the first pogo pin via a first contact pad; and
the conductive path is coupled to the second pogo pin via a second contact pad; and
processing circuitry configured to:
detect a change in an electrical characteristic of the conductive path indicating a transition from a first circuit state of the conductive path to a second circuit state of the conductive path, wherein the conductive path is coupled to the processing circuitry via the first pogo pin and the second pogo pin; and
determine, in response to the change being detected, a deformation event in the battery pack.

2. The battery pack of claim 1, wherein:
the processing circuitry is configured to detect the change in the electrical characteristic based on a signal received via the first electrical connector and the second electrical connector, and the first circuit state is a closed circuit state of the conductive path and the second circuit state is an open circuit state of the conductive path.

3. The battery pack of claim 1, wherein:
the conductive path comprises:
a first separate loop of conductive material; and
a second separate loop of conductive material; and
the processing circuitry is configured to detect the change in the electrical characteristic of the conductive path by detecting a change in an electrical characteristic of the first separate loop of conductive material or by detecting a change in an electrical characteristic of the second separate loop of conductive material.

4. The battery pack of claim 1, wherein:
the conductive path comprises:
a first separate loop of conductive material;
a second separate loop of conductive material;
a third separate loop of conductive material; and
a fourth separate loop of conductive material; and
the processing circuitry is configured to detect the change in the electrical characteristic of the conductive path by detecting changes in an electrical characteristic of:
the first separate loop of conductive material and the third separate loop of conductive material; or
the first separate loop of conductive material and the fourth separate loop of conductive material; or
the second separate loop of conductive material and the third separate loop of conductive material; or
the second separate loop of conductive material and the fourth separate loop of conductive material.

5. The battery pack of claim 1, wherein the processing circuitry is configured to detect the change in the electrical characteristic of the conductive path by:
determining, based on an output signal of a digital flip-flop, a transition from a first state of the digital flip-flop to a second state of the digital flip-flop.

6. The battery pack of claim 1, further comprising:
an upper layer;
a lower layer; and
a middle layer disposed between the upper layer and the lower layer, the middle layer comprising the conductive path.

7. The battery pack of claim 1, wherein:
the processing circuitry is configured to detect the change in the electrical characteristic of the conductive path by determining that the electrical characteristic exceeds a threshold amount.

8. The battery pack of claim 1, wherein the deformation event comprises a puncture or a bend and wherein the processing circuitry is further configured to:
cause a notification to be generated for display, at a display of an electric vehicle, wherein the notification comprises an indication that the battery pack is damaged by the puncture or the bend.

9. The battery pack of claim 1, wherein the processing circuitry is further configured to:
in response to determining the deformation event in the battery pack, determine, based on sensor data received from an isolation leakage sensor, whether isolation leakage is present; and
in response to determining a presence of the isolation leakage, generate for output, at a display of an electric vehicle, a notification indicating the presence of the isolation leakage.

10. The battery pack of claim 1, wherein the processing circuitry is further configured to:

determine, based on sensor data, that water is present in the battery pack; and cause a notification to be generated for display, at a display of an electric vehicle, based on the determination that water is present and the determination of the deformation event.

11. A method comprising:

detecting, by processing circuitry of a battery pack, a change in an electrical characteristic of a conductive path of the battery pack, the change indicating a transition from a first circuit state of the conductive path to a second circuit state of the conductive path, wherein:

the battery pack comprises at least one layer;

the conductive path comprises a continuous loop of conductive material embedded in the at least one layer;

the conductive path is coupled to a first electrical connector and a second electrical connector;

the first electrical connector comprises a first pogo pin and the second electrical connector comprises a second pogo pin;

the conductive path is coupled to the first pogo pin via a first contact pad; and the conductive path is coupled to the second pogo pin via a second contact pad; and determining, by the processing circuitry, in response to the change being detected, a deformation event in the battery pack.

12. The method of claim 11, wherein:

the conductive path comprises:

a first separate loop of conductive material; and a second separate loop of conductive material; and detecting the change in the electrical characteristic of the conductive path comprises detecting a change in an electrical characteristic of the first separate loop of conductive material or by detecting a change in an electrical characteristic of the second separate loop of conductive material.

13. The method of claim 11, wherein:

the conductive path comprises:

a first separate loop of conductive material;

a second separate loop of conductive material;

a third separate loop of conductive material; and a fourth separate loop of conductive material; and detecting the change in the electrical characteristic of the conductive path comprises detecting changes in an electrical characteristic of:

the first separate loop of conductive material and the third separate loop of conductive material; or the first separate loop of conductive material and the fourth separate loop of conductive material; or the second separate loop of conductive material and the third separate loop of conductive material; or the second separate loop of conductive material and the fourth separate loop of conductive material.

14. The method of claim 11, wherein:

detecting the change in the electrical characteristic of the conductive path is performed based on a signal received via the first electrical connector and the second electrical connector, and the first circuit state is a closed circuit state of the conductive path and the second circuit state is an open circuit state of the conductive path.

15. The method of claim 11, wherein detecting the change in the electrical characteristic of the conductive path comprises:

determining, based on an output signal of a digital flip-flop, a transition from a first state of the digital flip-flop to a second state of the digital flip-flop.

16. A non-transitory computer-readable medium having non-transitory computer-readable instructions encoded thereon that, when executed by a processor, cause the processor to:

detect a change in an electrical characteristic of a conductive path of a battery pack, the change indicating a transition from a first circuit state of the conductive path to a second circuit state of the conductive path, wherein:

the battery pack comprises at least one layer;

the conductive path comprises a continuous loop of conductive material embedded in the at least one layer;

the conductive path is coupled to a first electrical connector and a second electrical connector;

the first electrical connector comprises a first pogo pin and the second electrical connector comprises a second pogo pin;

the conductive path is coupled to the first pogo pin via a first contact pad; and the conductive path is coupled to the second pogo pin via a second contact pad; and determine, in response to the change being detected, a deformation event in the battery pack.

17. The non-transitory computer-readable medium of claim 16, wherein the execution of the instructions causes the processor to detect the change in the electrical characteristic based on a signal received via the first electrical connector and the second electrical connector, and the first circuit state is a closed circuit state of the conductive path and the second circuit state is an open circuit state of the conductive path.

18. The non-transitory computer-readable medium of claim 16, wherein the deformation event comprises a puncture or a bend and wherein the execution of the instructions further causes the processor to:

cause a notification to be generated for display, at a display of an electric vehicle, wherein the notification comprises an indication that the battery pack is damaged by the puncture or the bend.

19. The non-transitory computer-readable medium of claim 16, wherein:

the conductive path comprises:

a first separate loop of conductive material; and a second separate loop of conductive material; and the execution of the instructions causes the processor to detect the change in the electrical characteristic of the conductive path by detecting a change in an electrical characteristic of the first separate loop of conductive material or by detecting a change in an electrical characteristic of the second separate loop of conductive material.

20. The non-transitory computer-readable medium of claim 16, wherein:

the conductive path comprises:

a first separate loop of conductive material;

a second separate loop of conductive material;

a third separate loop of conductive material; and a fourth separate loop of conductive material; and the execution of the instructions causes the processor to detect the change in the electrical characteristic of the conductive path by detecting changes in an electrical characteristic of:

the first separate loop of conductive material and the third separate loop of conductive material; or the first separate loop of conductive material and the fourth separate loop of conductive material; or the second separate loop of conductive material and the third separate loop of conductive material; or the second separate loop of conductive material and the fourth separate loop of conductive material.

* * * * *